United States Patent
Wu et al.

(10) Patent No.: US 10,819,455 B2
(45) Date of Patent: Oct. 27, 2020

(54) BROADCAST PROCESSING METHOD, NON-TRANSITORY STORAGE MEDIUM, AND ELECTRONIC DEVICE

(71) Applicant: Guangdong OPPO Mobile Telecommunications Corp., Ltd., Dongguan, Guangdong (CN)

(72) Inventors: Ruyu Wu, Guangdong (CN); Runsheng Pei, Guangdong (CN); Liangjing Fu, Guangdong (CN); Zhiyong Lin, Guangdong (CN); Jun Zhang, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 16/565,385

(22) Filed: Sep. 9, 2019

(65) Prior Publication Data
US 2020/0008016 A1  Jan. 2, 2020

Related U.S. Application Data (63) Continuation of application No. PCT/CN2017/107186, filed on Oct. 21, 2017.

(30) Foreign Application Priority Data

Mar. 10, 2017   (CN) .......................... 2017 1 0140903

(51) Int. Cl.
*H04H 20/42* (2008.01)
*H04W 72/00* (2009.01)
(Continued)

(52) U.S. Cl.
CPC ........ *H04H 20/423* (2013.01); *H04H 20/426* (2013.01); *H04H 20/72* (2013.01);
(Continued)

(58) Field of Classification Search
CPC ....... H04W 72/005; H04W 4/06; H04W 4/14; H04W 4/60
See application file for complete search history.

(56) References Cited

U.S. PATENT DOCUMENTS 8,413,206 B1 * 4/2013 Wyatt ............... H04N 21/25866
725/136
2004/0229636 A1 * 11/2004 Kim .................. H04M 1/72547
455/466
(Continued)

FOREIGN PATENT DOCUMENTS

| CN | 101156463 A | 4/2008 |
| CN | 104994481 A | 10/2015 |

(Continued)

OTHER PUBLICATIONS

European search report, European Patent application No. 17900023.7, dated Jan. 23, 2020 (9 pages).
(Continued)

*Primary Examiner* — Keith Ferguson (57) ABSTRACT

A method for broadcast processing, a non-transitory storage medium and an electronic device are provided. The method includes: acquiring a currently-sending broadcast message in a broadcast queue; determining a type of the broadcast message; and calling an interface configured to send the broadcast message and sending the broadcast message to a corresponding broadcast receiver.

12 Claims, 3 Drawing Sheets

(51) Int. Cl.
*H04W 4/06* (2009.01)
*H04W 4/60* (2018.01)
*H04H 20/72* (2008.01)
*H04W 4/14* (2009.01)

(52) U.S. Cl.
CPC ............... *H04W 4/06* (2013.01); *H04W 4/60* (2018.02); *H04W 72/005* (2013.01); *H04W 4/14* (2013.01)

(56) References Cited

U.S. PATENT DOCUMENTS

2016/0323170 A1  11/2016  Hu et al.
2017/0055139 A1  2/2017   Sennett et al.

FOREIGN PATENT DOCUMENTS

CN  105872989 A  8/2016
CN  105897438 A  8/2016
CN  106686557 A  5/2017

OTHER PUBLICATIONS

Igor Kalkov et al: "Predictable Broadcasting of Parallel Intents in Real-Time Android" Java Technologies for Real-Time and Embedded Systems, ACM, 2 Penn Plaza, Suite 701 New York NY 10121-0701 USA Oct. 13, 2014 (Oct. 13, 2014), pp. 57-66 (10 pages).

International search report, PCT/CN2017/107186, dated Jan. 11, 2018 (2 pages).

English translation of First Office Action issue in a counterpart Chinese Patent application No. 201710140903.3, dated Mar. 7, 2018 (6 pages).

* cited by examiner

BROADCAST PROCESSING METHOD, NON-TRANSITORY STORAGE MEDIUM, AND ELECTRONIC DEVICE

CROSS-REFERENCE TO RELATED APPLICATION(S)

This application is a continuation of International Patent Application No. PCT/CN2017/107186, filed on Oct. 21, 2017, which claims priority to Chinese Patent Application No. 201710140903.3, filed on Mar. 10, 2017, the contents of both of which are herein incorporated by reference in their entireties.

TECHNICAL FIELD

The present disclosure relates to the field of computer technologies, and in particular to a broadcast processing method, a non-transitory storage medium, and an electronic device.

BACKGROUND

Broadcast is a mechanism widely used among applications for information transmission. Taking an Android system as an example, data transmission and sharing among applications may be performed by means of broadcasts. Typically, broadcasts may be short message broadcasts, phone call broadcasts, and other broadcasts pre-embedded in the Android system.

In the Android system, a broadcast sender sends a broadcast message by calling a sendBroadcast function. A broadcast receiver registers a BroadcastReceiver with a management module by calling a registerReceiver function and defines broadcast messages of interest, thereby implementing receiving of corresponding broadcast messages.

SUMMARY

In a first aspect, a broadcast processing method may be provided in some embodiments of the present disclosure. The method may include the following operations: acquiring a currently-sending broadcast message in a broadcast queue; determining a type of the broadcast message; and calling an interface configured to send the broadcast message and sending the broadcast message to a corresponding broadcast receiver when the broadcast message is a normal broadcast message in type.

In a second aspect, a broadcast processing apparatus may be further provided in some embodiments of the present disclosure. The broadcast processing apparatus may include: an acquisition module, configured to acquire a currently-sending broadcast message in a broadcast queue; a determining module, configured to determine a type of the broadcast message; and a sending module, configured to call an interface configured to send the broadcast message and send the broadcast message to a corresponding broadcast receiver when the type of the broadcast message is the normal broadcast.

In a third aspect, a non-transitory storage medium may be further provided in some embodiments of the present disclosure. The non-transitory storage medium may store a plurality of instructions which, when executed by a processor, cause the processor to perform the broadcast processing method as previously described.

In a fourth aspect, an electronic device may be further provided in some embodiments of the present disclosure.

The electronic device may include: a processor, a non-transitory memory, and a computer program stored on the non-transitory memory and executable by the processor. The processor is configured to execute the computer program to perform operations comprising: acquiring a currently-sending broadcast message in a broadcast queue; determining a type of the broadcast message; and calling an interface configured to send the broadcast message and sending the broadcast message to a corresponding broadcast receiver when the broadcast message is a normal broadcast message in type.

BRIEF DESCRIPTION OF DRAWINGS

Technical solutions and other advantageous effects of the present disclosure will be apparent from the detailed description of the embodiments of the present disclosure with reference to the drawings.

DETAILED DESCRIPTION

The present disclosure will be described in details below with reference to the drawings and embodiments. It should be understood that, the embodiments described herein are used to explain the disclosure and not to limit the disclosure. In addition, it is also to be noted that, for convenience of description, only parts relevant to the disclosure, instead of all contents are illustrated in the drawings.

In general, when the registration of the broadcast receiver is performed by means of static registration, a management module will place a broadcast message into an ordered broadcast queue and send the broadcast message in order, regardless of whether the broadcast message sent by a broadcast sender is a normal broadcast message or an ordered broadcast message. In this way, the broadcast processing is inefficient, too many system resources are consumed, and the stability is poor. Embodiments of the present disclosure may overcome the above by using the following implementation manners.

A broadcast processing method may include the following operations: acquiring a currently-sending broadcast message in a broadcast queue; determining a type of the broadcast message; and calling an interface configured to send the broadcast message and sending the broadcast message to a corresponding broadcast receiver when the broadcast message is a normal broadcast message in type.

In some embodiments, the calling an interface configured to send the broadcast message and sending the broadcast message to a corresponding broadcast receiver includes: generating a feedback parameter; calling, according to the feedback parameter, the interface configured to send the broadcast message; and sending the broadcast message to the corresponding broadcast receiver.

In some embodiments, the calling an interface configured to send the broadcast message and sending the broadcast message to a corresponding broadcast receiver when the broadcast message is a normal broadcast message in type includes: when the broadcast message is a normal broadcast message in type, determining the number of the corresponding broadcast receivers; calling, according to the number of the broadcast receivers, the interface configured to send the broadcast message a number of times corresponding to the number of the broadcast receivers; and sending the broadcast message sequentially to the corresponding broadcast receivers, or sending the broadcast message synchronously to the corresponding broadcast receivers, or sending the broadcast message sequentially and synchronously to the corresponding broadcast receivers.

In some embodiments, the sending the broadcast message to a corresponding broadcast receiver includes: creating a broadcast message object, setting an identification value for the broadcast message, adding the identification value to the broadcast message, and sending the broadcast message including the identification value to the corresponding broadcast receiver; and monitoring a processing period of the sent broadcast message including the identification value; when the processing period is longer than a preset monitoring period, triggering a timeout response mechanism; wherein the preset monitoring period is longer than a system default monitoring period.

In some embodiments, after the monitoring a processing period of the sent broadcast message including the identification value, the method further includes: according to a feedback result that indicates the processing to the broadcast message by the corresponding broadcast receiver, canceling monitoring the processing period of the broadcast message; wherein the feedback result comprises the identification value for the broadcast message.

In some embodiments, the identification value is a hash value.

In some embodiments, the determining a type of the broadcast message may include: determining, according to a sending instruction used in sending the broadcast message, the type of the broadcast message.

In some embodiments, the broadcast queue is an ordered broadcast queue. The calling an interface configured to send the broadcast message and sending the broadcast message to a corresponding broadcast receiver may include: directly sending the normal broadcast message in the ordered broadcast queue to a next broadcast receiver without waiting for a feedback result of a previous broadcast receiver; wherein the feedback result is configured to indicate the processing to the broadcast message by the corresponding broadcast receiver.

A non-transitory storage medium may be further provided in some embodiments of the present disclosure. The non-transitory storage medium may store a plurality of instructions which, when executed by a processor, cause the processor to perform the broadcast processing operations including: acquiring a currently-sending broadcast message in a broadcast queue; determining a type of the broadcast message; and calling an interface configured to send the broadcast message and sending the broadcast message to a corresponding broadcast receiver when the broadcast message is a normal broadcast message in type.

In some embodiments, the operation of calling an interface configured to send the broadcast message and sending the broadcast message to a corresponding broadcast receiver may include: generating a feedback parameter; calling, according to the feedback parameter, the interface configured to send the broadcast message; and sending the broadcast message to the corresponding broadcast receiver.

In some embodiments, the operation of calling an interface configured to send the broadcast message and sending the broadcast message to a corresponding broadcast receiver when the broadcast message is a normal broadcast message in type may include: when the broadcast message is a normal broadcast message in type, determining the number of the corresponding broadcast receivers; calling, according to the number of the broadcast receivers, the interface configured to send the broadcast message a number of times corresponding to the number of the broadcast receivers; and sending the broadcast message sequentially to the corresponding broadcast receivers, or sending the broadcast message synchronously to the corresponding broadcast receivers, or sending the broadcast message sequentially and synchronously to the corresponding broadcast receivers.

In some embodiments, the operation of sending the broadcast message to a corresponding broadcast receiver may include: creating a broadcast message object, setting an identification value for the broadcast message, adding the identification value to the broadcast message, and sending the broadcast message including the identification value to the corresponding broadcast receiver; monitoring a processing period of the sent broadcast message including the identification value; when the processing period is longer than a preset monitoring period, triggering a timeout response mechanism; wherein the preset monitoring period is longer than a system default monitoring period; and according to a feedback result that indicates processing to the broadcast message by the corresponding broadcast receiver, canceling monitoring the processing period of the broadcast message; wherein the feedback result comprises the identification value for the broadcast message.

An electronic device may be further provided in some embodiments of the present disclosure. The electronic device may include: a processor, a non-transitory memory, and a computer program stored on the non-transitory memory and executable by the processor. The processor is configured to execute the computer program to perform operations comprising: acquiring a currently-sending broadcast message in a broadcast queue; determining a type of the broadcast message; and calling an interface configured to send the broadcast message and sending the broadcast message to a corresponding broadcast receiver when the broadcast message is a normal broadcast message in type.

In some embodiments, the operation of calling an interface configured to send the broadcast message and sending the broadcast message to a corresponding broadcast receiver may include: generating a feedback parameter; calling, according to the feedback parameter, the interface configured to send the broadcast message; and sending the broadcast message to the corresponding broadcast receiver.

In some embodiments, the operation of calling an interface configured to send the broadcast message and sending the broadcast message to a corresponding broadcast receiver when the broadcast message is a normal broadcast message in type may include: when the broadcast message is a normal broadcast message in type, determining the number of the corresponding broadcast receivers; calling, according to the number of the broadcast receivers, the interface configured to send the broadcast message a number of times corresponding to the number of the broadcast receivers; and sending the broadcast message sequentially to the corresponding broadcast receivers, or sending the broadcast message synchronously to the corresponding broadcast receivers, or sending the broadcast message sequentially and synchronously to the corresponding broadcast receivers.

In some embodiments, the operation of sending the broadcast message to a corresponding broadcast receiver may include: creating a broadcast message object, setting an identification value for the broadcast message, adding the identification value to the broadcast message, and sending the broadcast message including the identification value to the corresponding broadcast receiver; and monitoring a processing period of the sent broadcast message including the identification value; when the processing period is longer than a preset monitoring period, triggering a timeout response mechanism; wherein the preset monitoring period is longer than a system default monitoring period.

In some embodiments, after the operation of monitoring a processing period of the sent broadcast message including the identification value, the operations further includes: according to a feedback result that indicates processing to the broadcast message by the corresponding broadcast receiver, canceling monitoring the processing period of the broadcast message; wherein the feedback result comprises the identification value for the broadcast message.

In some embodiments, the identification value is a hash value.

In some embodiments, the operation of determining a type of the broadcast message may include: determining, according to a sending instruction used in sending the broadcast message, the type of the broadcast message.

In some embodiments, the broadcast queue is an ordered broadcast queue. The operation of calling an interface configured to send the broadcast message and sending the broadcast message to a corresponding broadcast receiver may include: directly sending the normal broadcast message in the ordered broadcast queue to a next broadcast receiver without waiting for a feedback result of a previous broadcast receiver; wherein the feedback result is configured to indicate the processing to the broadcast message by the corresponding broadcast receiver.

In some embodiments of the present disclosure, the currently-sending broadcast message in the broadcast queue may be acquired, and the type of the broadcast message may be determined. When the broadcast message is a normal broadcast message in type, the interface configured to send the broadcast message may be called, and the broadcast message may be sent to the corresponding broadcast receiver. In this way, it is possible to solve the problem in the related art that when the broadcast receiver is registered by using the static registration, the normal broadcast message is also arranged in the ordered broadcast queue, and the broadcast processing efficiency is low. Therefore, the speed of processing the broadcast may be increased, the consumption of the system resources may be reduced, and the stability of the system may be improved.

The details will be described below.

Figure 1:
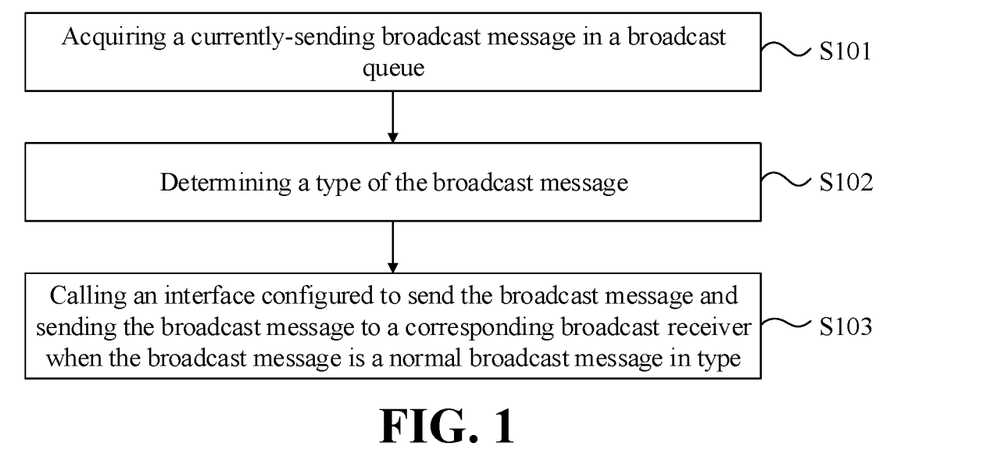
FIG. 1 is a flow chart illustrating a broadcast processing method according to some embodiments of the present disclosure.

FIG. 1 is a flow chart illustrating a broadcast processing method according to some embodiments of the present disclosure. The method may be performed by an electronic device according to some embodiments of the present disclosure. The electronic device may have a broadcast processing apparatus, and the broadcast processing apparatus may be implemented in a software manner and/or a hardware manner. As shown in FIG. 1, a specific solution according to some embodiment may include operations executed by the following blocks.

At block S101, a currently-sending broadcast message in a broadcast queue may be acquired.

During the broadcast processing, a service process of a broadcast sender may send a broadcast message to a management module (such as ActivityManagerService) by calling a broadcast sending function (such as the sendBroadcast function). After receiving the broadcast message, the management module may place the broadcast message into a broadcast queue. The management module may then send the broadcast message in the broadcast queue to a broadcast receiver which satisfies a receiving condition by means of a process communication mechanism (such as a Binder process communication mechanism).

In a broadcast mechanism, a broadcast message may refer to information sent in a running process of a system or an application and transmitted between the system and the application. Exemplarily, the broadcast message may be a system-startup broadcast message, a short-message broadcast message, a phone-call broadcast message, a third-party application broadcast message, or the like. A process of sending the broadcast message by the broadcast sender and a process of receiving the broadcast message by the broadcast receiver may be performed asynchronously. The broadcast sender and the broadcast receiver may be matched with each other in a low-coupling relation by means of the management module. That is to say, after sending the broadcast message, the broadcast sender may not concern about which specific broadcast receiver is going to receive the message, and the broadcast receiver may receive the broadcast message of interest without concerning about which specific broadcast sender sends the message.

In some embodiments, the management module may receive the broadcast message sent by the broadcast sender and place the broadcast message in the broadcast queue. The management module may sequentially send the broadcast messages in the broadcast queue. The process in which the broadcast sender sends the broadcast message to the management module may be expressed as follows (taking a counter application sending a broadcast message as an example).

// Create a broadcast message
Intent intent=new Intent (BROADCAST_COUNTER_ACTION);
// Transfer counter parameters and corresponding count values
intent.putExtra (COUNTER_VALUE, counter);
// Send the broadcast message
sendBroadcast (intent)

In some embodiments, the currently-sending broadcast message in the broadcast queue may be acquired. When the broadcast queue is an ordered broadcast queue, after an ordered broadcast message is sent out, it is necessary to wait until all corresponding broadcast receivers have already processed the broadcast message and send a feedback result to the management module configured to maintain the broadcast queue. After receiving the feedback result, the management module may determine, according to the feedback result, that the sent ordered broadcast has been processed. After that, the next broadcast message in the broadcast queue may start to be sent. In some embodiments, the currently-sending broadcast message may be the broadcast message that has already been sent or the broadcast message that is prepared for transmission after receiving the feedback result of the previous broadcast message.

At block S102, a type of the broadcast message may be determined.

In some embodiments, according to different ways of sending the broadcast messages, the broadcast messages may be classified into normal broadcast messages and ordered broadcast messages. After a normal broadcast message is sent by the management module, the broadcast receivers may receive the broadcast message out of order. After the ordered broadcast message is sent by the management module, the broadcast receivers may sequentially receive the broadcast message in an order. That is to say, only when the first broadcast receiver receives the broadcast message and completely processes the broadcast message, the second broadcast receiver may be allowed to start to receive and process the broadcast message, and so on.

In some embodiments, a registration instruction of the broadcast receiver may be a registration instruction (static registration instruction) registered in the management module, and may also be a registration instruction (dynamic registration instruction) registered in an application of the broadcast receiver. When the registration of the broadcast receiver is performed by means of static registration, regardless of whether the broadcast sender sends the normal broadcast message or an ordered broadcast message, the management module may place the corresponding broadcast message into the ordered broadcast queue and sequentially send the broadcast message. In this way, a speed of processing the broadcast message itself may be greatly affected, and the speed of processing other broadcast messages in the ordered broadcast queue may also be affected.

In some embodiments, after the currently-sending broadcast message in the broadcast queue is acquired, the type of the broadcast message may be determined. Exemplarily, it is possible to determine the type of the broadcast message according to a sending instruction used by the broadcast sender to send the broadcast message (for example, the broadcast message sent by using the sendBroadcast function may be a normal broadcast message in type, and the broadcast message sent by using the sendOrderedBroadcast function may be an ordered broadcast message in type).

At block S103, when the broadcast message is a normal broadcast message in type, an interface configured to send the broadcast message may be called, and the broadcast message may be sent to a corresponding broadcast receiver.

In some embodiments, based on a determination that the currently-sending broadcast message is a normal broadcast message in type, the interface configured to send the broadcast message may be called, and the broadcast message may be sent to the corresponding broadcast receiver. In this way, by determining the type of the broadcast message, the normal broadcast message in the ordered broadcast queue may be directly sent to the corresponding next broadcast receiver without needing to wait for the feedback result of the previous broadcast receiver. Thus, the speed of processing the normal broadcast message may be improved, while the speed of processing the broadcasts in the ordered broadcast queue may also be greatly increased. Herein, the broadcast receiver will provide a feedback result after the corresponding broadcast message is completely processed, that is to say, the feedback result may be provided by the broadcast receiver and configured to indicate that the broadcast message is completely processed by the corresponding broadcast receiver.

In some embodiments, when the broadcast receiver receives the broadcast message, the management module may acquire the registration instruction for the broadcast receiver. The registration instruction for the broadcast receiver may be sent by the broadcast receiver. In general, the broadcast receiver may register with (subscribe for) the management module for desired broadcast messages by means of the process communication mechanism. A service process of the broadcast receiver may register the broadcast receiver in the management module by calling a registerReceiver function, and define the broadcast messages of interest at the same time. When sending the broadcast message in the broadcast queue, according to a registration situation of the broadcast receiver, the management module may send the broadcast message to a message cycle queue corresponding to the broadcast receiver that subscribes for the message. After receiving the broadcast message, the broadcast receiver may call back a receiving method (such as an onReceive method) in the registered broadcast receiver to execute corresponding functions to process the received broadcast message.

Taking the broadcast message sent by the counter as an example, a registration process of receiving the broadcast message by the broadcast receiver may be expressed as follow.

// Define a broadcast message of interest (broadcast message subscription)
IntentFiltercounterActionFilter=
new IntentFilter(CounterService.BROADCAST_COUNTER_ACTION);
// Register the broadcast receiver
registerReceiver(counterActionReceiver, counterActionFilter)

When the broadcast message (BROADCAST_COUNTER_ACTION) sent by the broadcast sender has been sent by the management module, since the broadcast receiver has registered a corresponding broadcast receiving unit for the broadcast message, the broadcast message may be received and processed by the corresponded broadcast receiver.

In the technical solution provided in some embodiments of the present disclosure, the currently-sending broadcast message in the broadcast queue may be acquired, and the type of the broadcast message may be determined. When the broadcast message is a normal broadcast message in type, the interface configured to send the broadcast message may be called, and the broadcast message may be sent to the corresponding broadcast receiver. In this way, it is possible to solve the problem in the related art that when the broadcast receiver is registered by using the static registration, the normal broadcast message is also arranged in the ordered broadcast queue, and the broadcast processing efficiency is low. Therefore, the speed of processing the broadcast may be increased, the consumption of the system resources may be reduced, and the stability of the system may be improved.

Figure 2:
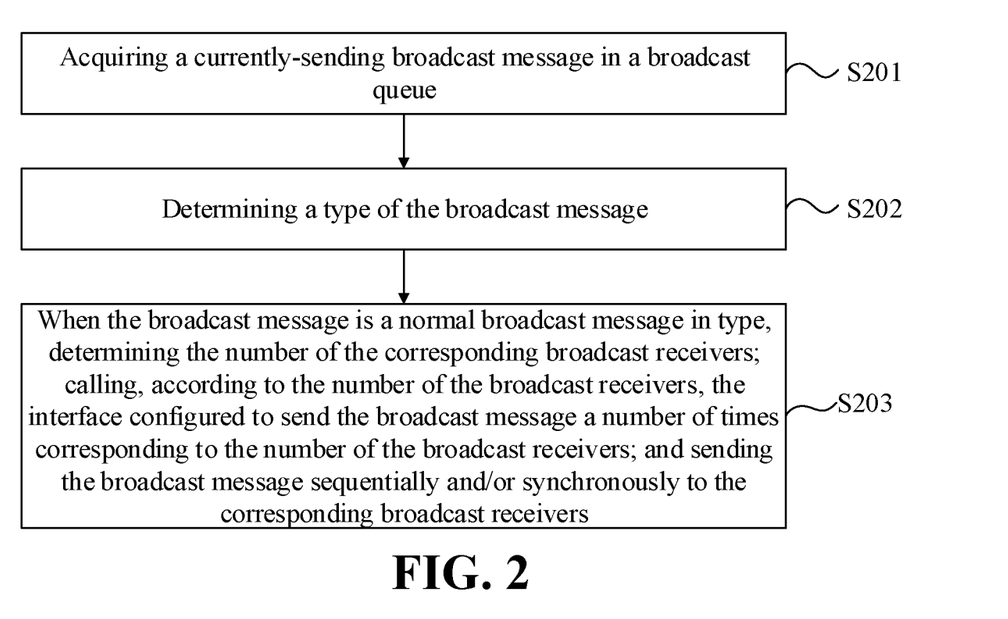
FIG. 2 is a flow chart illustrating another broadcast processing method according to some embodiments of the present disclosure.

FIG. 2 is a flow chart illustrating another broadcast processing method according to some embodiments of the present disclosure. On the basis of the above embodiment, alternatively, when the broadcast message is a normal broadcast message in type, then the operation of calling the interface configured to send the broadcast message and sending the broadcast message to the corresponding broadcast receiver may further include the following operations.

When the broadcast message is a normal broadcast message in type, the number of corresponding broadcast receivers may be determined; according to the number of the broadcast receivers, the interface configured to send the broadcast message may be called a number of times corresponding to the number of the broadcast receivers, and the broadcast message may be sequentially and/or synchronously sent to the corresponding broadcast receiver. That is to say, the broadcast message may be sequentially sent to the corresponding broadcast receiver, or synchronously sent to the corresponding broadcast receiver, or sequentially and synchronously sent to the corresponding broadcast receiver. Herein, "the number of times corresponding to the number of the broadcast receivers" means that, the number of times may be equal to the number of the broadcast receivers.

Based on the above optimization, as shown in FIG. 2, technical solutions provided in some embodiments may include following operations.

At block S201, the currently-sending broadcast message in a broadcast queue may be acquired.

At block S202, the type of the broadcast message may be determined.

At block S203, when the broadcast message is the normal broadcast message in type, the number of corresponding broadcast receivers may be determined. According to the number of the broadcast receivers, the interface configured to send the broadcast message may be called a corresponding number corresponding to the number of the broadcast receivers, and the broadcast message may be sequentially and/or synchronously sent to the corresponding broadcast receiver.

In some embodiments, the operation of calling the interface configured to send the broadcast message and sending the broadcast message to the corresponding broadcast receiver may further include: generating a feedback parameter; calling, according to the feedback parameter, the interface configured to send the broadcast message; and sending the broadcast message to the corresponding broadcast receiver. For the broadcast message in the ordered broadcast queue, each broadcast receiver needs to process the broadcast message successively, and feed the processing result back. After that, the next broadcast receiver may process the broadcast message. In some embodiments, by generating the feedback parameter (which may be understood as a false parameter generated by the system) to replace the original processing result, the interface configured to send the broadcast message may be directly called to send the broadcast message. In this way, it is unnecessary to wait for the current broadcast receiver to feed back the processing feedback result and call the interface configured to send the broadcast message based on the processing feedback result to send the broadcast message.

In some embodiments, the broadcast receivers corresponding to the broadcast message may be traversed, the number of the broadcast receivers may be determined, the interface configured to send the broadcast message may be sequentially and/or synchronously called, and the broadcast message may be sent to the corresponding broadcast receivers. In this way, a plurality of broadcast receivers may receive and process the broadcast message in time or at the same time, and the processing efficiency of the broadcast message may be greatly improved.

In some embodiments of the present disclosure, the broadcast processing method may be provided, which may solve the defects of the broadcast mechanism in the related art, improve the broadcast processing efficiency, reduce the consumption of the system resources, and increase the stability of the system.

Figure 3:
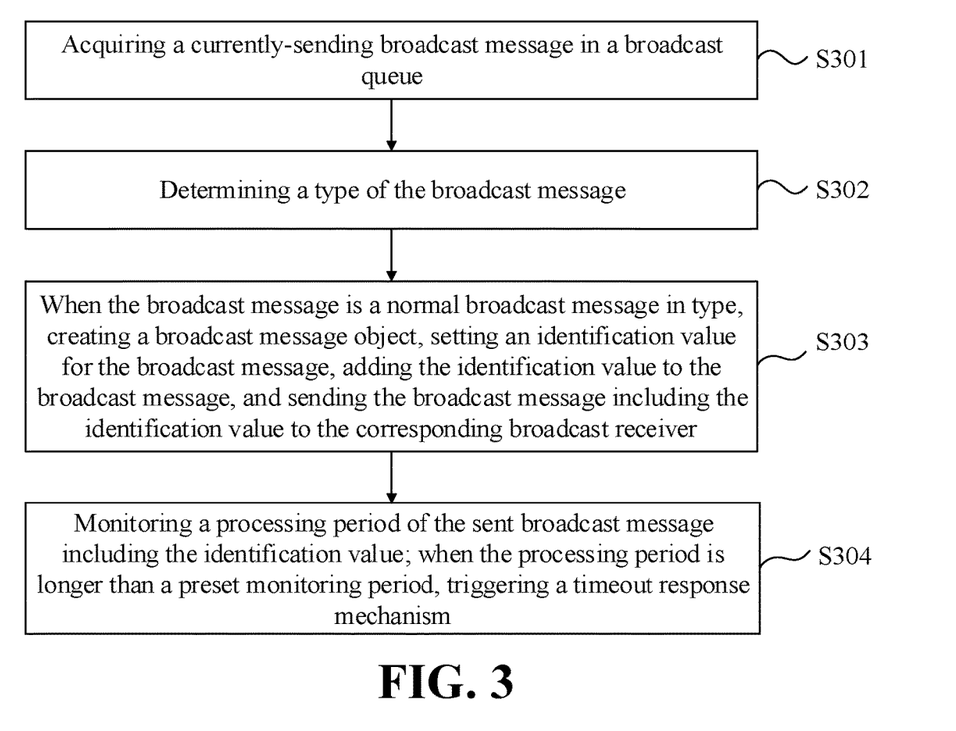
FIG. 3 is a flow chart illustrating a further broadcast processing method according to some embodiments of the present disclosure.

FIG. 3 is a flow chart illustrating a further broadcast processing method according to some embodiments of the present disclosure. On the basis of the foregoing embodiments, alternatively, the operation of sending the broadcast message to the corresponding broadcast receiver may include following operations.

A broadcast message object may be created. An identification value for the broadcast message may be set. The identification value may be added to the broadcast message. The broadcast message including the identification value may be further sent to the corresponding broadcast receiver.

A processing period of the sent broadcast message including the identification value may be monitored. When the processing period is longer than a preset monitoring period, a timeout response mechanism may be triggered. In some embodiments, the preset monitoring period may be longer than a system default monitoring period.

Based on the above optimization, as shown in FIG. 3, the technical solution provided in some embodiments may specifically include following operations.

At block S301, a currently-sending broadcast message in a broadcast queue may be acquired.

At block S302, a type of the broadcast message may be determined.

At block S303, when the broadcast message is a normal broadcast message in type, the interface configured to send the broadcast message may be called. A broadcast message object may be created. An identification value for the broadcast message may be set. The identification value may be added to the broadcast message. The broadcast message including the identification value may be further sent to the corresponding broadcast receiver.

In some embodiments, the identification value may be a hash value. Each hash value may correspond to a unique broadcast message. The broadcast message may be uniquely identified and confirmed by adding the identification value to the broadcast message.

At block S304, a processing period of the sent broadcast message including the identification value may be monitored. When the processing period is longer than a preset monitoring period, a timeout response mechanism may be triggered.

In some embodiments, the timeout response mechanism may be set by the management module for the transmission of the broadcast message. That is, when the broadcast message is sent slowly, the timeout response mechanism may be triggered, and the application may be caused to exit. In this operation, the preset monitoring period may be longer than a system default monitoring period (the preset monitoring period may be 1.5-3 times of the system default monitoring period). Exemplarily, timing may be started after the broadcast message including the identification value is sent. When the feedback result that the broadcast message has been completely processed has not been received during the preset monitoring period, the timeout response mechanism may be triggered. In the technical solution of the related art, when the speed of sending the broadcast message needs to be increased, the system default monitoring period needs to be reduced. When the system default monitoring period is increased, the speed of sending the broadcast message may be significantly decreased. However, in the broadcast processing mechanism used in the technical solution according to some embodiments of the present disclosure, the normal broadcast message may be sent quickly. In this way, the speed of sending the broadcast message may be increased, and meanwhile a probability that the timeout response mechanism is triggered may be significantly reduced since the preset monitoring period is longer than the system default monitoring period.

After monitoring the processing period of the sent broadcast message including the identification value, the method may further include the following operations: according to the feedback result that indicates the processing to the broadcast message by the corresponding broadcast receiver, canceling monitoring the processing period of the broadcast message. In some embodiments, the feedback result may include the identification value for the broadcast message. When the feedback result of the broadcast receiver is received, the corresponding monitored broadcast message may be determined according to the identification value in the feedback result, and the monitoring of the broadcast message may be removed.

In some embodiments of the present disclosure, the broadcast processing method may be provided, which may increase the speed of processing the broadcast message, reduce the probability of sending a timeout response, further improve the broadcast processing mechanism, and improve the broadcast processing efficiency.

Figure 4:
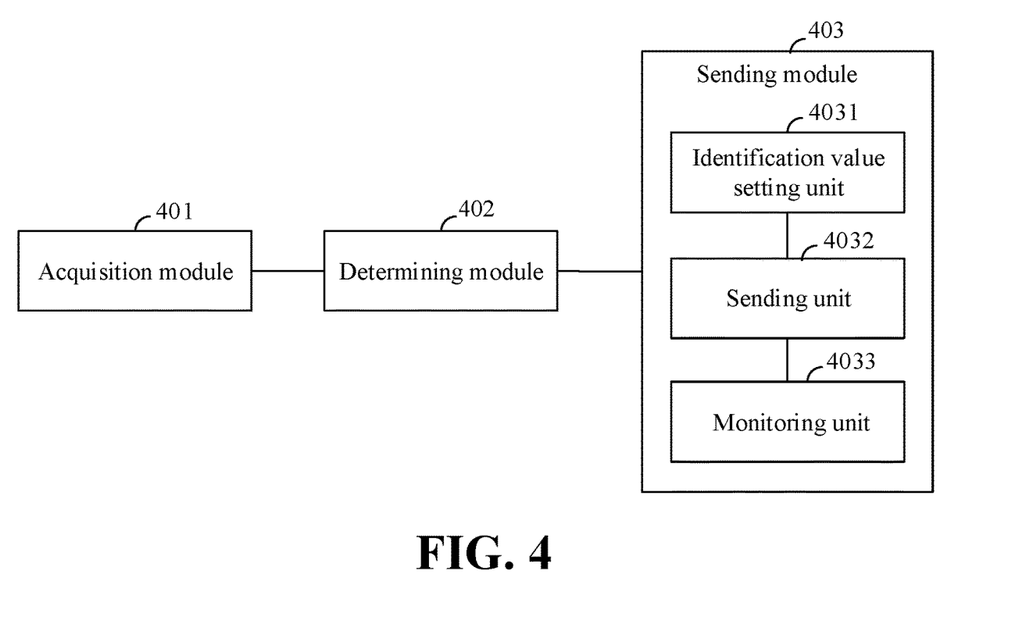
FIG. 4 is a block diagram illustrating a broadcast processing apparatus according to some embodiments of the present disclosure.

FIG. 4 is a block diagram illustrating a broadcast processing apparatus according to some embodiments of the present disclosure. The apparatus may be configured to execute the broadcast processing method according to the foregoing embodiments, may include corresponding functional modules configured to execute the method, and may achieve beneficial effects. As shown in FIG. 4, the apparatus may include an acquisition module 401, a determining module 402, and a sending module 403.

The acquisition module 401 may be configured to acquire a currently-sending broadcast message in a broadcast queue.

The determining module 402 may be configured to determine a type of the broadcast message.

The sending module 403 may be configured to call an interface configured to send the broadcast message and send the broadcast message to a corresponding broadcast receiver when the broadcast message is a normal broadcast message in type.

In the technical solution according to some embodiments, the defects of the broadcast mechanism in the related art may be solved, the broadcast processing efficiency may be improved, the consumption of the system resources may be reduced, and the stability of the system may be improved.

Alternatively, the sending module 403 may be specifically configured to: generate a feedback parameter; call, according to the feedback parameter, the interface configured to send the broadcast message; and send the broadcast message to the corresponding broadcast receiver.

Alternatively, the sending module 403 may be specifically configured to: when the broadcast message is a normal broadcast message in type, determine the number of corresponding broadcast receivers; call, according to the number of the broadcast receivers, the interface configured to send the broadcast message a corresponding number of times corresponding to the number of the broadcast receivers; and send the broadcast message sequentially and/or synchronously to the corresponding broadcast receiver. Likewise, "the number of times corresponding to the number of the broadcast receivers" means that, the number of times may be equal to the number of the broadcast receivers.

Alternatively, the sending module 403 may specifically include an identification value setting unit 4031, a sending unit 4032, and a monitoring unit 4033. The identification value setting unit 4031 may be configured to create a broadcast message object, set an identification value for the broadcast message, and add the identification value to the broadcast message. The sending unit 4032 may be configured to send the broadcast message including the identification value to the corresponding broadcast receiver. The monitoring unit 4033 may be configured to monitor a processing period of the sent broadcast message including the identification value, and trigger a timeout response mechanism when the processing period is longer than a preset monitoring period. In some embodiments, the preset monitoring period may be longer than a system default monitoring period.

Alternatively, the monitoring unit 4033 may be further configured to: after the processing period of the sent broadcast message including the identification value is monitored, cancel monitoring the processing period of the broadcast message according to the feedback result that indicates the processing to the broadcast message by the corresponding broadcast receiver. In some embodiments, the feedback result may include the identification value for the broadcast message.

In some embodiments of the present disclosure, a storage medium may be further provided. The storage medium may store a plurality of instructions. The instructions may be adapted to be executed by a processor to perform the operations in the broadcast processing method described in any of the foregoing embodiments.

It should be noted that, those skilled in the art may understand that, all or a part of the operations in the foregoing embodiments may be completed by a program to instruct related hardware. The program may be stored in a computer-readable storage medium. The storage medium may be a non-transitory storage medium or a transitory storage medium. More specifically, the storage medium may include: a Read Only Memory (ROM), a Random Access Memory (RAM), a magnetic disk, an optical disk, or the like.

Figure 5:
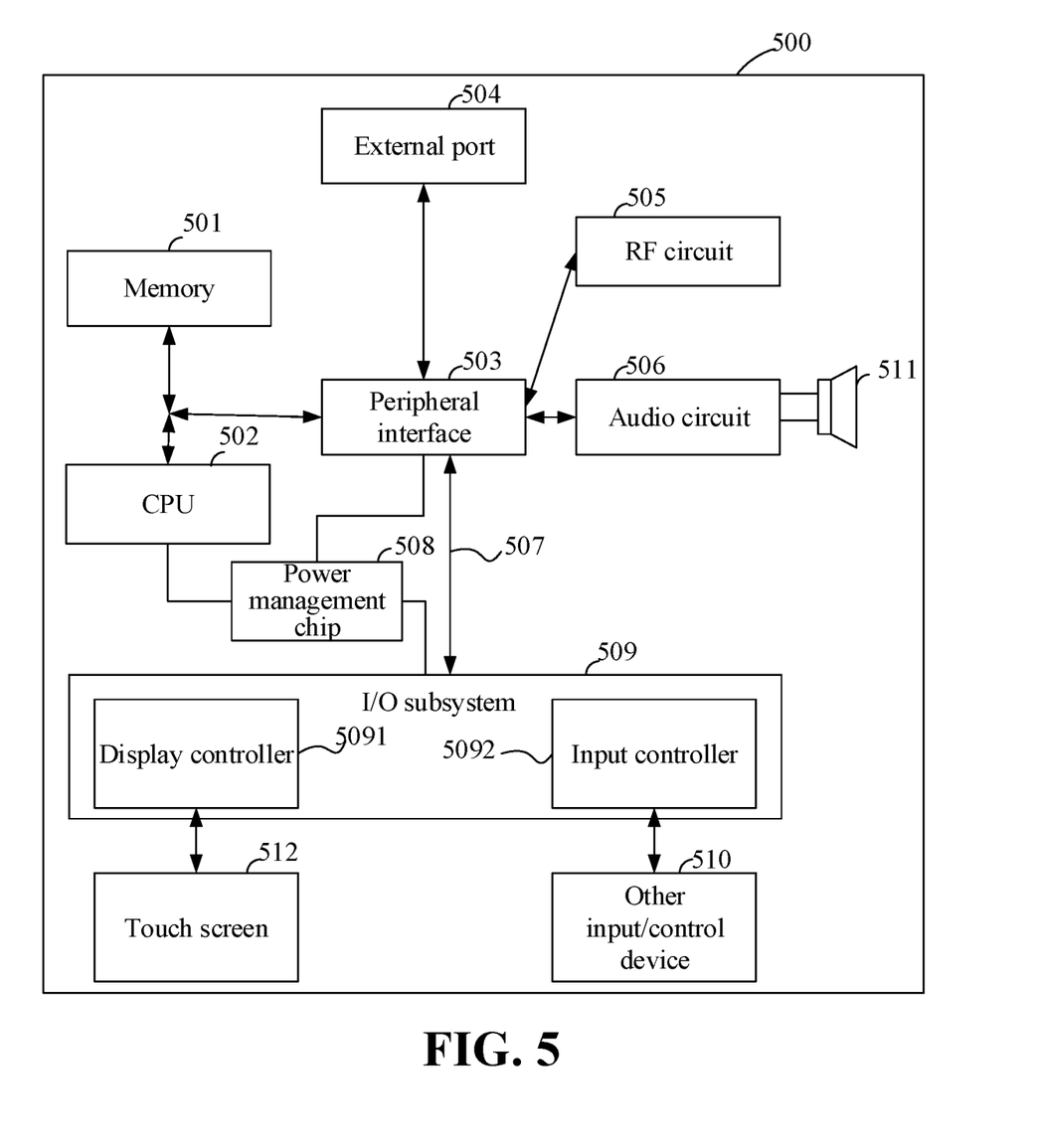
FIG. 5 is a block diagram illustrating an electronic device according to some embodiments of the present disclosure.

In some embodiments, an electronic device may be further provided on the basis of all the above embodiments. The electronic device may include the broadcast processing apparatus according to some embodiments of the present disclosure. FIG. 5 is a block diagram illustrating an electronic device according to some embodiments of the present disclosure. As shown in FIG. 5, the electronic device may include a memory 501, a Central Processing Unit (CPU) 502, a peripheral interface 503, a Radio Frequency (RF) circuit 505, an audio circuit 506, a speaker 511, a power management chip 508, an input/output (I/O) subsystem 509, a touch screen 512, other input/control devices 510, and an external port 504. All these components may communicate through one or more communication buses or signal lines 507.

It should be understood that, the electronic device 500 shown in the drawings is only an example of the electronic device. The electronic device 500 may include components more or less than the those illustrated in the drawings. Two or more components may be combined, or electronic device 500 may have various configurations. Various components shown in the drawings may be implemented in hardware, software, or a combination of hardware and software. The hardware may include one or more signal processing and dedicated integrated circuits.

The electronic device for the broadcast processing will be described in details hereafter. A smart phone may be used as an example of the electronic device.

The memory 501 may be accessed by the CPU 502, the peripheral interface 503, and the like. The memory 501 may include a high-speed random access memory or a nonvolatile memory such as one or more disk memory devices or flash memory devices. Or, the memory 501 may include other volatile solid-state memory devices.

The peripheral interface 503 may connect input/output peripherals of the device to the CPU 502 and the memory 501.

The I/O subsystem 509 may connect the input/output peripherals on the device (such as the touch screen 512 and other input/control devices 510) to the peripheral interface 503. The I/O subsystem 509 may include a display controller 5091 and one or more input controllers 5092 configured to control the other input/control devices 510. In some embodiments, the one or more input controllers 5092 may receive an electrical signal from the other input/control devices 510 or send an electrical signal to the other input/control devices 510. The other input/control devices 510 may include a physical button (a push button, a rocker button, and the like), a dial, a slide switch, a joystick, a clicking roller, and the like. It should be noted that the input controller 5092 may be connected to any one of a keyboard, an infrared port, a Universal Serial Bus (USB) interface, and a pointing device such as a mouse.

The touch screen 512 may be an input interface and an output interface between a user terminal and a user, and display visual output to the user. The visual output may include a graph, a text, an icon, a video, and the like.

The display controller 5091 in the I/O subsystem 509 may receive an electrical signal from the touch screen 512 or send an electrical signal to the touch screen 512. The touch screen 512 may detect a touch on the touch screen, and the display controller 5091 may convert the detected touch into an interaction with a user interface object displayed on the touch screen 512 to achieve human-computer interaction. The user interface object displayed on the touch screen 512 may be an icon configured to run a game, an icon of connection to a corresponding network, and the like. It should be noted that, the device may further include an optical mouse. The optical mouse may be a touch-sensitive surface that does not display the visible output, or an extension of the touch-sensitive surface formed by the touch screen.

The RF circuit 505 may be configured to establish communication between the mobile phone and a wireless network (that is, network side), such that data receiving and sending between the mobile phone and the wireless network (such as receiving and sending messages, emails, and the like) may be achieved. More specifically, the RF circuit 505 may receive and send an RF signal. Herein, the RF signal may also be referred to as an electromagnetic signal. The RF circuit 505 may convert an electrical signal into an electromagnetic signal or convert an electromagnetic signal into an electrical signal, and communicate with a communication network and other devices through the electromagnetic signal. The RF circuit 505 may include a known circuit configured to execute the above functions. The RF circuit 505 may include, but be not limited to, an antenna system, an RF transceiver, one or more amplifiers, a tuner, one or more oscillators, a digital signal processor, a COder-DECoder (CODEC) chipset, a Subscriber Identity Module (SIM), and the like.

The audio circuit 506 may be configured to receive audio data from the peripheral interface 503, convert the audio data into an electrical signal, and send the electrical signal to the speaker 511.

The speaker 511 may be configured to restore a voice signal received by the mobile phone from the wireless network through the RF circuit 505 into a sound, and play the sound to the user.

The power management chip 508 may be configured to supply power and manage power on hardware connected to the CPU 502, the I/O subsystem, and peripheral interface.

The CPU 502 according to some embodiments of the present disclosure may perform following operations.

A currently-sending broadcast message in a broadcast queue may be acquired.

A type of the broadcast message may be determined.

When the broadcast message is a normal broadcast message in type, an interface configured to send the broadcast message may be called, and the broadcast message may be sent to a corresponding broadcast receiver.

Alternatively, the operation of calling the interface configured to send the broadcast message and sending the broadcast message to the corresponding broadcast receiver may further include following operations.

A feedback parameter may be generated. An interface configured to send the broadcast message may be called according to the feedback parameter. The broadcast message may be sent to the corresponding broadcast receiver.

Alternatively, when the broadcast message is a normal broadcast message in type, the operation of calling the interface configured to send the broadcast message and sending the broadcast message to the corresponding broadcast receiver may further include following operations.

When the broadcast message is a normal broadcast message in type, the number of corresponding broadcast receivers may be determined. According to the number of the broadcast receivers, the interface configured to send the broadcast message may be called a corresponding number of times corresponding to the number of the broadcast receivers, and the broadcast message may be sequentially and/or synchronously sent to the corresponding broadcast receiver.

Alternatively, the operation of sending the broadcast message to the corresponding broadcast receiver may include following operations.

A broadcast message object may be created. An identification value for the broadcast message may be set. The identification value may be added to the broadcast message. The broadcast message including the identification value may be further sent to the corresponding broadcast receiver.

A processing period of the sent broadcast message including the identification value may be monitored. When the processing period is longer than a preset monitoring period, a timeout response mechanism may be triggered. In some embodiments, the preset monitoring period may be longer than a system default monitoring period.

Alternatively, after monitoring the processing period of the sent broadcast message including the identification value, the operations may further include the following.

According to the feedback result that indicates the processing to the broadcast message by the corresponding broadcast receiver, monitoring the processing period of the broadcast message may be canceled. In some embodiments, the feedback result may include the identification value for the broadcast message.

It should be noted that, the above description is only about preferred embodiments of the present disclosure and implemented technical principles. Those skilled in the art may understand that the present disclosure should not be limited to the specific embodiments described herein. Those skilled in the art shall be able to perform various obvious modifications, re-adjustment and replacement to the embodiments without departing from the scope of the present disclosure. Therefore, although the present disclosure may be described in details through the above-mentioned embodiments, the present disclosure should not be limited to the above-mentioned embodiments. Without departing from the concepts of the present disclosure, many other equivalent embodiments may also be included, and the scope of the present disclosure is defined by the claims.

What is claimed is:

1. A method for broadcast processing, comprising:
   acquiring a currently-sending broadcast message in an ordered broadcast queue;
   determining a type of the broadcast message; and when the broadcast message is a normal broadcast message in type, generating a feedback parameter, calling an interface configured to send the broadcast message according to the feedback parameter and sending the broadcast message to a corresponding broadcast receiver;

wherein calling the interface configured to send the broadcast message according to the feedback parameter comprises:

directly sending the normal broadcast message in the ordered broadcast queue to a next broadcast receiver without waiting for a feedback result of a previous broadcast receiver, wherein the feedback result is configured to indicate the processing to the broadcast message by the corresponding broadcast receiver.

2. The method of claim 1, further comprising:

when the broadcast message is a normal broadcast message in type, determining the number of the corresponding broadcast receivers;

calling, according to the number of the broadcast receivers, the interface configured to send the broadcast message a number of times corresponding to the number of the broadcast receivers; and sending the broadcast message sequentially to the corresponding broadcast receivers, or sending the broadcast message synchronously to the corresponding broadcast receivers, or sending the broadcast message sequentially and synchronously to the corresponding broadcast receivers.

3. The method of claim 1, wherein sending the broadcast message to a corresponding broadcast receiver comprises:

creating a broadcast message object, setting an identification value for the broadcast message, adding the identification value to the broadcast message, and sending the broadcast message including the identification value to the corresponding broadcast receiver; and monitoring a processing period of the sent broadcast message including the identification value; and when the processing period is longer than a preset monitoring period, triggering a timeout response mechanism; wherein the preset monitoring period is longer than a system default monitoring period.

4. The method of claim 3, further comprising:

after the monitoring a processing period of the sent broadcast message including the identification value, according to a feedback result that indicates the processing to the broadcast message by the corresponding broadcast receiver, canceling monitoring the processing period of the broadcast message, wherein the feedback result comprises the identification value for the broadcast message.

5. The method of claim 3, wherein the identification value is a hash value.

6. The method of claim 1, wherein determining a type of the broadcast message comprises:

determining, according to a sending instruction used in sending the broadcast message, the type of the broadcast message.

7. A terminal device, comprising a processor, a non-transitory memory, and a computer program stored on the non-transitory memory and executable by the processor, wherein the processor is configured to execute the computer program to perform operations comprising:

acquiring a currently-sending broadcast message in an ordered broadcast queue;

determining a type of the broadcast message; and when the broadcast message is a normal broadcast message in type, generating a feedback parameter, calling an interface configured to send the broadcast message according to the feedback parameter and sending the broadcast message to a corresponding broadcast receiver;

wherein the operation of calling the interface configured to send the broadcast message according to the feedback parameter and sending the broadcast message to the corresponding broadcast receiver comprises:

directly sending the normal broadcast message in the ordered broadcast queue to a next broadcast receiver without waiting for a feedback result of a previous broadcast receiver; wherein the feedback result is configured to indicate the processing to the broadcast message by the corresponding broadcast receiver.

8. The terminal device of claim 7, wherein the operation further comprises:

when the broadcast message is a normal broadcast message in type, determining the number of the corresponding broadcast receivers;

calling, according to the number of the broadcast receivers, the interface configured to send the broadcast message a number of times corresponding to the number of the broadcast receivers; and sending the broadcast message sequentially to the corresponding broadcast receivers, or sending the broadcast message synchronously to the corresponding broadcast receivers, or sending the broadcast message sequentially and synchronously to the corresponding broadcast receivers.

9. The terminal device of claim 7, wherein the operation of sending the broadcast message to a corresponding broadcast receiver comprises:

creating a broadcast message object, setting an identification value for the broadcast message, adding the identification value to the broadcast message, and sending the broadcast message including the identification value to the corresponding broadcast receiver; and monitoring a processing period of the sent broadcast message including the identification value; and when the processing period is longer than a preset monitoring period, triggering a timeout response mechanism; wherein the preset monitoring period is longer than a system default monitoring period.

10. The terminal device of claim 9, wherein the operations further comprises:

after the operation of monitoring a processing period of the sent broadcast message including the identification value, according to a feedback result that indicates processing to the broadcast message by the corresponding broadcast receiver, canceling monitoring the processing period of the broadcast message; wherein the feedback result comprises the identification value for the broadcast message.

11. The terminal device of claim 9, wherein the identification value is a hash value.

12. The terminal device of claim 7, wherein the operation of determining a type of the broadcast message comprises:

determining, according to a sending instruction used in sending the broadcast message, the type of the broadcast message.

* * * * *